US009016571B2

(12) United States Patent
Lee et al.

(10) Patent No.: US 9,016,571 B2
(45) Date of Patent: Apr. 28, 2015

(54) TWO DIMENSIONAL CODE AND METHOD OF CREATING THE SAME

(71) Applicant: National Tsing Hua University, Hsinchu (TW)

(72) Inventors: Ruen Rone Lee, Hsinchu (TW); Hung Kuo Chu, Hsinchu (TW); Niloy J. Mitra, London (GB)

(73) Assignee: National Tsing Hua University, Hsinchu (TW)

( * ) Notice: Subject to any disclaimer, the term of this patent is extended or adjusted under 35 U.S.C. 154(b) by 47 days.

(21) Appl. No.: 13/962,650

(22) Filed: Aug. 8, 2013

(65) Prior Publication Data

US 2015/0041539 A1 Feb. 12, 2015

(51) Int. Cl.
*G06K 5/00* (2006.01)
*G06K 19/06* (2006.01)

(52) U.S. Cl.
CPC ............ *G06K 19/06037* (2013.01); *G06K 5/00* (2013.01)

(58) Field of Classification Search
CPC .......... G06K 19/06037; G06K 7/1417; G06K 19/06046; G06K 7/14; G06K 7/1443; G06K 9/00442; G06K 9/00577; G06K 19/06103; G06K 19/06131; G06K 19/06178; G06K 19/086; G06K 19/10; G06K 19/14; G06K 19/18; H04N 1/00363
USPC ........ 235/454, 494, 462.01–462.05; 382/181, 382/233, 190, 101
See application file for complete search history.

(56) References Cited

U.S. PATENT DOCUMENTS

| 6,549,640 | B1* | 4/2003 | Sansone et al. | 382/101 |
| 2002/0181772 | A1* | 12/2002 | Ihara et al. | 382/181 |
| 2005/0219616 | A1* | 10/2005 | Furuta et al. | 358/1.18 |
| 2005/0263598 | A1* | 12/2005 | Harada | 235/462.09 |
| 2006/0164451 | A1* | 7/2006 | Pulver et al. | 347/12 |
| 2010/0170950 | A1* | 7/2010 | Iwai et al. | 235/454 |
| 2012/0327450 | A1* | 12/2012 | Sagan et al. | 358/1.14 |

OTHER PUBLICATIONS

Zhou Wang et al., Image quality assessment: From error visibility to structural similarity, IEEE Transactions on Image Processing, vol. 13, No. 4, Apr. 2004, pp. 1-14.
Jianghao Chang et al., Structure-aware error diffusion, ACM Trans. Graph.(Proc. SIGGRAPH Asia) 28, 5, 162:1-162:8, 2009.
Jan Eric Kyprianidis et al., Image abstraction by structure adaptive filtering, EG UK Theory and Practice of Computer Graphics, 2008, pp. 51-58.

* cited by examiner

*Primary Examiner* — Thien M Le
(74) *Attorney, Agent, or Firm* — WPAT, P.C.; Anthony King

(57) ABSTRACT

A computer-implemented method of creating a two dimensional code comprises providing a two dimensional code comprising a cell, providing a picture comprising a patch corresponding to the cell of the two dimensional code, providing a plurality of cell patterns different from each other, wherein each cell pattern comprises a plurality of sub-cells, and determining one of the plurality of cell patterns for the cell of the two dimensional code according to the patch of the picture.

16 Claims, 3 Drawing Sheets

TWO DIMENSIONAL CODE AND METHOD OF CREATING THE SAME

BACKGROUND OF THE INVENTION

1. Field of the Invention

The present invention relates to a two dimensional code and a method of creating the same, and more particularly, to a two dimensional code embedded with a pattern and a method of creating the same.

2. Description of the Related Art

A Quick Response Code (QR code) is a two dimensional matrix code which includes black and white squares. Each of the squares is called a module. A QR code has a data section. Data is converted into a bit stream and then stored in 8 bit parts (called codewords) in the data section. Normally, in a QR code, one module represents one bit.

A QR code is placed on a position, usually an external surface, of a product that allows a code reader to easily scan. However, the visually unpleasant black and white code may ruin the aesthetic appearance of the product. To overcome such an undesirable consequence, a visual QR code is created by incorporating colors, letters, illustrations, or logos into a QR code.

The present approaches used to create visual QR codes are not perfect. In order to maintain the readability of a visual QR code regardless of orientation or poor illumination, these approaches make a limited modification to a QR code by use of an embedded image. As a result, a generated visual QR code cannot clearly show the embedded image.

SUMMARY OF THE INVENTION

In one embodiment of the present invention, a two dimensional code comprises at least one cell corresponding to a bit of a codeword. The at least one cell comprises a plurality of sub-cells, wherein one of the plurality of sub-cells is used to store the bit of the codeword.

One embodiment of the present invention discloses a computer-implemented method of creating a two dimensional code. The method comprises providing a two dimensional code comprising a cell; providing a picture comprising a patch corresponding to the cell of the two dimensional code; providing a plurality of cell patterns different from each other, wherein each cell pattern comprises a plurality of sub-cells; and determining one of the plurality of cell patterns for the cell of the two dimensional code according to the patch of the picture.

Another embodiment of the present invention discloses a computer-implemented method of creating a two dimensional code. The method comprises providing a two dimensional code comprising a plurality of cells; providing a picture comprising a plurality of patches corresponding to the plurality of cells of the two dimensional code; providing a plurality of cell patterns different from each other, wherein each cell pattern comprises a plurality of sub-cells; providing a pattern assignment set comprising a plurality of set elements correspondingly representing the plurality of cells of the two dimensional code; defining an energy function according to the pattern assignment set, the two dimensional code, the picture, and the plurality of cell patterns; and using the energy function to determine one of the plurality of cell patterns for each set element.

BRIEF DESCRIPTION OF THE DRAWINGS

The objectives and advantages of the present invention will become apparent upon reading the following description and upon referring to the accompanying drawings in which.

DETAILED DESCRIPTION OF THE INVENTION

Figure 1:
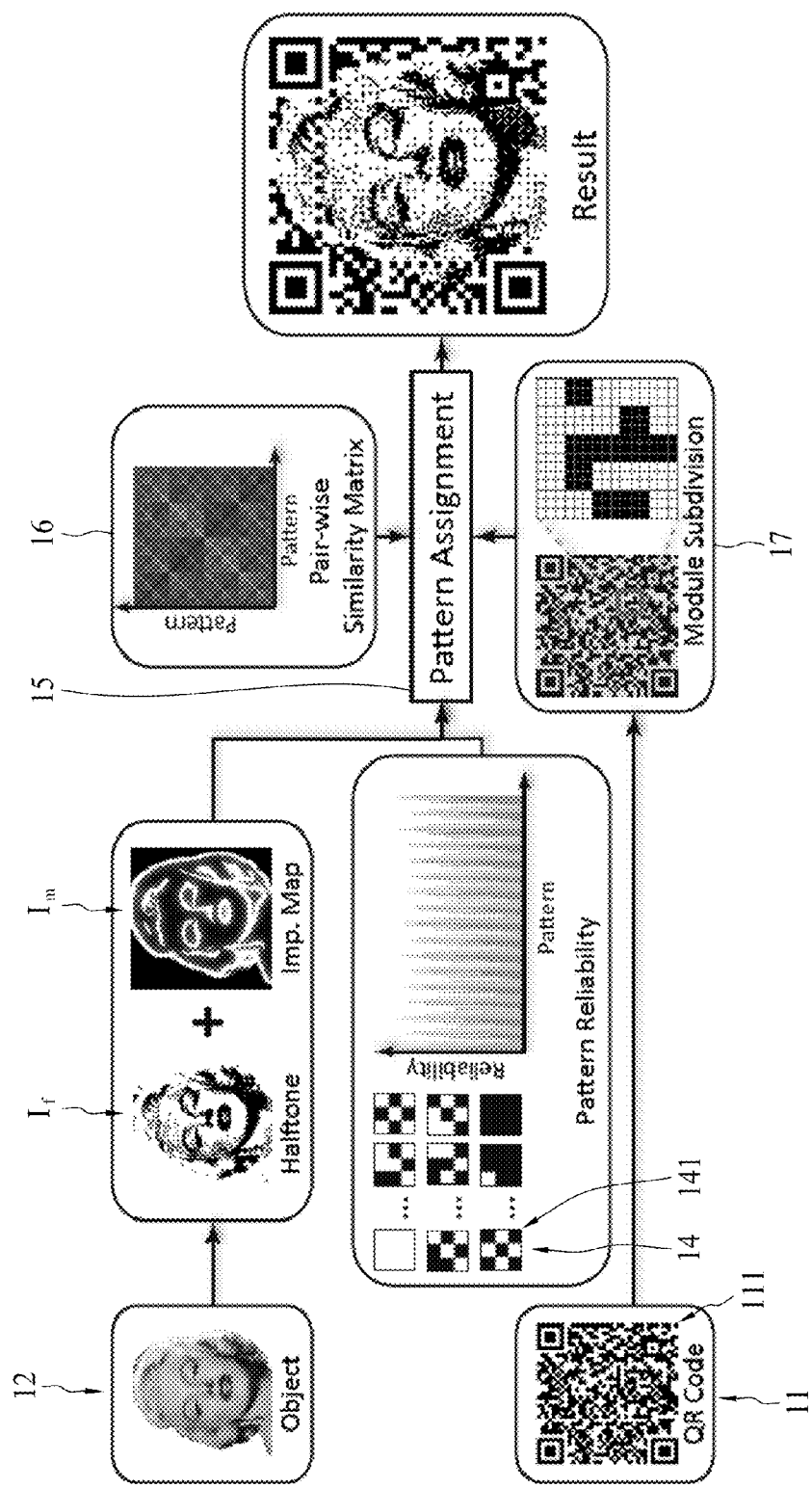
FIG. 1 is a diagram showing a method of creating a two dimensional code according to one embodiment of the present invention.

In one embodiment of the present invention, a set of cell patterns are used to simulate patches of a picture. A cell pattern similar to a corresponding patch of a picture is selected to replace a cell of a two dimensional code so that the pattern of the patch can be incorporated into the two dimensional code. Further, the selected cell pattern and the replaced cell have the same bit value so that the original two dimensional code and the new two dimensional code can be scanned and generate the same result.

In one embodiment of the present invention, a two dimensional code comprises a cell used for storing a bit of code information. The cell corresponds to one of a plurality of patches of a picture. Each patch may comprise a plurality of units. A plurality of cell patterns is provided and each cell pattern comprises a plurality of sub-cells. One cell pattern whose sub-cells are similar to those of the corresponding patch is selected to replace the cell of the two dimensional code. In one embodiment, the selected cell pattern has a bit level similar to that of the replaced cell. In one embodiment, the selected cell pattern can be the cell pattern that is most similar to the corresponding patch. In one embodiment, the selected cell pattern can be a cell pattern of a group of cell patterns that are most similar to the corresponding patch. In one embodiment, the similarity between the cell pattern and the patch can be measured by a distance.

In some embodiments of the present invention, a two dimensional code comprises a plurality of cells. At least a portion of the cells are used to store data or codewords. The codeword can be of 4, 8, 16 or 32 bit length. Preferably, each codeword is comprised of 8 bits. The cell can have, but is not limited to, a square shape. The plurality of cells can be connected together and arranged in a two dimensional manner. At least a portion of the cells can be modified or replaced such that each of the modified or replaced cells can include a plurality of sub-cells, wherein at least one of the sub-cells is used to represent a bit of a codeword or data, and the other sub-cells are used for displaying at least a portion of a visual feature.

The selection of a sub-cell for storing a bit of a codeword should ensure that the bit can be properly read out. The selection of a sub-cell for storing a bit of a codeword may comply with a standard for the two dimensional code. For example, when the two dimensional code is a QR code, the center one of a plurality of sub-cells arranged in a 3×3 matrix in a cell is normally selected for storing a bit of a codeword; otherwise, the bit may not be correctly read out. However, a sub-cell of a cell other than the center one can be selected if the two dimensional code is used in a system that can still correctly read out the bit.

The cells can have, but are not limited to, the same size. The sub-cells can have, but are not limited to, the same size.

The plurality of sub-cells can be arranged into, but is not limited to, a square matrix. The plurality of sub-cells can be arranged into an n×n matrix, where n can be an odd number and greater than one.

The two dimensional code can comprise, but is not limited to, black and white cells. The two dimensional code can comprise, but is not limited to, a QR code.

FIG. 1 is a diagram showing a method of creating a two dimensional code according to one embodiment of the present invention. Referring to FIG. 1, the method of the present disclosure provides or receives, on a computer device, a two dimensional code 11. The two dimensional code 11 may comprise a plurality of cells 111. At least a portion of the cells 111 are used to store data or codewords. In one embodiment, the two dimensional code 11 can comprise a QR code, and the cell 111 can be also called a module.

Although the two dimensional code 11 in the present embodiment comprises black and white cells 111, the present invention is not limited to such an embodiment.

The method of the present disclosure provides or receives, on a computer device, a raw picture 12. The raw picture 12 may comprise an object image, a letter, a drawing, a logo, an icon, or the like. Although the present disclosure demonstrates the method of the present disclosure using a raw picture 12, the disclosure is not limited to such a demonstration.

The picture 12 can have a size similar to the two dimensional code 11, and if not, the method of the present disclosure processes the picture 12 on a computer device to a desired size matched with that of the two dimensional code 11.

The method of the present disclosure then converts the picture 12 on a computer device into a halftone picture $I_f$. In one embodiment, the halftone picture $I_f$ can be generated by the method of the present disclosure disclosed in a paper entitled "Structure-aware error diffusion," *ACM Trans. Graph. (Proc. SIGGRAPH Asia)* 28, 5, 162:1-162:8, 2009, by Chang et al., the relevant disclosures of which are incorporated herein by reference. In one embodiment, the halftone picture $I_f$ can be generated by image processing tools such as nonlinear diffusion, stochastic flipping or the like. The method of generating a halftone picture $I_f$ is not limited to the above-mentioned methods.

The method of the present disclosure then identifies salient feature regions of the picture 12 on a computer device. The method of the present disclosure can use an image filter on a computer device to generate an importance map $I_m$, which can highlight salient feature regions of the picture 12. The method of the present disclosure can determine the salient feature regions on a computer device according to the importance map $I_m$. In one embodiment, the method of the present disclosure can use a technique on a computer device disclosed in a paper entitled "Image abstraction by structure adaptive filtering," *In Proc. EG UK Theory and Practice of Computer Graphics*, 51-58, 2008, by Kypriandis, J. E., et. al., the relevant disclosures of which are incorporated herein by reference to generate the importance map $I_m$. In another embodiment, the method of the present disclosure allows users to manually determine which region of the picture 12 or importance map $I_m$ is a salient feature region. In another embodiment, the salient feature regions of the picture 12 can be determined by using an image process operator, such as the Canny edge detection, gradient image operators, or the like.

The picture 12 or the halftone picture $I_f$ may comprise a plurality of patches corresponding to the plurality of cells 111 of the two dimensional code 11. A patch may comprise a plurality of units of the picture 12 or halftone picture $I_f$. In one embodiment, each unit may comprise at least one pixel. In one embodiment, a patch comprises a plurality of units that are arranged into a matrix. In one embodiment, a patch comprises a plurality of units that are arranged into an n×n matrix, where n is greater than one. In one embodiment, n is greater than one and is an odd number. In the present embodiment, a patch is a 3×3 matrix.

Referring to FIG. 1, in one embodiment, the method can perform a module subdivision step 16 for a pattern assignment step 15, in which each of at least one portion of the cells 111 of the two dimensional code 11 can be subdivided into a plurality of sub-cells corresponding to the units of a corresponding patch of the picture 12.

The halftone picture $I_f$ and the two dimensional code 11 can be represented by a set M:

$$M=\{m_i=(I_i^m, c_i^m, \omega_i)|i=1,\ldots,n\} \quad (1)$$

where $m_i$ is the $i^{th}$ element of M; $I_i^m$ is the bit value of the units (color or binary information) of the $i^{th}$ patch of the halftone picture $I_f$; $c_i^m$ is a bit value of the $i^{th}$ cell of the two dimensional code 11; $\omega_i$ is an importance weight; and n is the number of the cells or patches. In one embodiment, the bit value may be color or binary information.

In one embodiment, $I_i^m$ is an average of the bit value of the units of the $i^{th}$ patch of the halftone picture $I_f$.

The importance weight indicated visual importance of the corresponding patch of the halftone picture $I_f$. In one embodiment, the importance weight $\omega_i$ can be determined by averaging the values of the units of the $i^{th}$ patch of the importance map $I_m$. In one embodiment, the importance weight $\omega_i$ can be determined according to the gradient of the $i^{th}$ patch to a neighboring patch in the halftone picture $I_f$. In one embodiment, the importance weight $\omega_i$ can be directly determined by users.

The method of the present disclosure provides a plurality of cell patterns 14 on a computer device, wherein the plurality of cell patterns 14 are different from each other. The cell pattern 14 can correspond in size to the cell 111 of the two dimensional code 11. A suitable cell pattern 14 can be used to replace any cell 111 of the two dimensional code 11 to provide a different visual effect while having the same bit value or generating the same data bit as the replaced cell 111. Each cell pattern 14 can comprise a plurality of sub-cells 141. The plurality of sub-cells 141 can be arranged into a matrix. The plurality of sub-cells 141 can be arranged into an n×n matrix, where n is greater than one. In one embodiment, n is an odd number and greater than one. In one embodiment, the sub-cells 141 of each cell pattern correspond to the units of a patch or the sub-cells of a cell 111.

In the present embodiment, a cell pattern 14 is a 3×3 matrix, and the set P of cell patterns 14 can be represented by:

$$P=\{p_i=(I_i^p, c_i^p, r_i)|i=1,\ldots,512\} \quad (2)$$

where $p_i$ is the $i^{th}$ element or module of the set P; $I_i^p$ is the bit value of sub-cells of the $i^{th}$ cell pattern (or an average of the bit values of the sub-cells of the $i^{th}$ cell pattern); $c_i^p$ is a bit value of the data sub-cell of the $i^{th}$ cell pattern; and $r_i$ is a readability or reliability value that can be in a range or interval [0, 1.0].

The data sub-cell is used to store bit data or information. In one embodiment, the data sub-cell of a cell pattern 14 can be either the center sub-cell or any sub-cells other than the center sub-cell.

In particular, when the data sub-cell of a cell pattern 14 has the same value as a cell 111, the cell pattern has the same bit value as the cell 111.

$r_i$ denotes the readability or reliability of the $i^{th}$ cell pattern. If a cell pattern has a higher readability or reliability value, it has a higher possibility to be correctly decoded even if the scanned image of a code comprising the cell pattern is distorted.

In one embodiment, when the cell pattern 14 is a 3×3 matrix and each sub-cell is either black or white, the set P can have 512 cell patterns 14 (all possible combinations). In one embodiment, when the cell pattern 14 is a 3×3 matrix and each sub-cell is either black or white, the set P can have less than 512 cell patterns 14.

In one embodiment, the number of sub-cells of a cell pattern 14 can be similar to that of units of a patch of the picture 12 or the halftone picture $I_f$; however, the present invention is not limited to such an embodiment.

In one embodiment, the halftone picture $I_f$ and the two dimensional code 11 are merged by combining the patches of the halftone picture $I_f$ and the corresponding cells of the two dimensional code 11. To this end, the method is configured to select, on a computer device, a cell pattern 14 that can generate the same bit information as the cell to be replaced and is similar to the corresponding patch for replacing the cell to be replaced. After replacing all cells desired to be replaced, the merging of the halftone picture $I_f$ and the two dimensional code 11 is completed. In order to determine a proper cell pattern 14 for each cell of the two dimensional code 11, the method provides, on a computer device, a pattern assignment set P':

$$P'=\{p'_i=(I_{f(i)}{}^P, c_{f(i)}{}^P, r_{f(i)}) | i=1, \ldots, n\} \quad (3)$$

where $p'_i$ is the $i^{th}$ set element that is assigned to the $i^{th}$ cell of the two dimensional code 11 or the $i^{th}$ patch of the halftone picture $I_f$; f(i) is an index representing the f(i)$^{th}$ cell pattern of the set P that is assigned correspondingly to the $i^{th}$ element of the set M.

The method performs a pattern assignment step 15 on a computer device to solve a pattern assignment problem for determining the set P'. The method uses, on a computer device, the pattern assignment set P', the set M including information from the two dimensional code 11 and halftone picture $I_f$, and uses the set P to define an energy function. The method then solves the energy function on a computer device to determine which set element $p'_i$ is preferably assigned which cell pattern 14. Consequently, a new two dimensional code formed by merging the halftone picture $I_f$ and the two dimensional code 11 can be obtained.

In one embodiment of the present invention, the energy function $E_{total}(P')$ may comprise a data term $E_D(P')$ and a binding constraint $E_C(P')$ and can be defined as:

$$E_{total}(P') = E_D(P') + E_C(P') \quad (4)$$

A graph G=(V,E) is applied in the method, where nodes of V correspond to the elements of the set M. Two nodes $m_i$ and $m_j$ are connected by an edge $e_{i,j} \in E$.

The data term $E_D(P')$ represents the preferences of individual cells 111 for their cell patterns 14. The data term $E_D(P')$ can be a sum over all cells 111 of individual cell preferences. The data term $E_D(P')$ can be defined as:

$$E_D(P') = \sum_{m_i \in V} D(I_i^m, I_{f(i)}^p) \quad (5)$$

The data term $E_D(P')$ can measure a similarity distance between the halftone picture $I_f$ and the pattern assignment set P', and the function D(-,-) is a distance metric or a similarity distance function. The distance metric can be, but is not limited to, Euclidean distance, Mahalanobis distance, Hausdorff distance, or the like. In one embodiment, a structural similarity index measure (SSIM) disclosed in a paper entitled "Image quality assessment: From error visibility to structural similarity," *IEEE Trans. on Vis. And Comp. Graphics* 13, 4, 600-612, 2004, by Wang, Z. et al., the relevant disclosures of which are incorporated herein by reference, is used to quantify the difference between the gray-scale and halftone images, or between, in the present embodiment, the pattern assignment set and the halftone picture.

In order to ensure that a new generated visualized code carries the same encoded data as the original two dimensional code 11, the binding constraint $E_C(P')$ is introduced. The binding constraint $E_C(P')$ imposes a penalty when a set element of the pattern assignment set P' is assigned a cell pattern 14 whose data sub-cell has a bit value different from that of the corresponding cell 111 of the two dimensional code 11. The binding constraint $E_C(P')$ can be defined as:

$$E_C(P') = \sum_{m_i \in M} \beta \delta_{m_i, p'_i} \quad (6)$$

$$\delta_{m_i, p'_i} = \begin{cases} 1 & \text{if } c_{f(i)}^p \neq c_i^m \\ 0 & \text{otherwise} \end{cases} \quad (7)$$

where β is a predetermined number. In one embodiment, β is a large integer. In one embodiment, β is 100.

In addition to considering similarity and ensuring consistency of encoded data, a readability or reliability term $E_R(P')$ can be considered. With such a consideration, the energy function can be defined as:

$$E_{total}(P') = \lambda E_R(P') + E_D(P') + E_C(P') \quad (8)$$

where λ is used to regulate the readability or reliability term $E_R(P')$.

The parameter λ can be used to adjust the readability of a new generated visualized code to meet the capabilities of different bar code readers.

In one embodiment, the readability or reliability term $E_R(P')$ can be defined as:

$$E_R(P') = \sum_{m_i \in M} \exp(-\omega_i)(1.0 - R(m_i, p'_i)) \quad (9)$$

$$R(m_i, p'_i) = \begin{cases} r_{f(i)} & \text{if } c_{f(i)}^p = c_i^m \\ 0 & \text{otherwise} \end{cases} \quad (10)$$

where $\omega_i$ is the above-mentioned importance weight and $r_{f(i)}$ is a measure of readability or reliability.

The measure of readability or reliability $r_{f(i)}$ prefers a cell pattern 14 which has high readability. However, selecting a cell pattern 14 with high readability may result in losing salient features of the picture 12. To avoid such a consequence, the importance weight $\omega_i$ is introduced. As such, the salient features will be considered when an assignment from the cell patterns 14 to the corresponding cell of the two dimensional code 11 is determining.

In an alternative embodiment, the readability or reliability term $E_R(P')$ can be defined as one of the following equations (11a) and (11b):

$$E_R(P') = \sum_{m_i \in M} \left(\frac{k}{\omega_i}\right)(1.0 - R(m_i, p'_i)) \quad (11a)$$

$$E_R(P') = \sum_{m_i \in M} (k - \omega_i)(1.0 - R(m_i, p'_i)) \quad (11b)$$

where k is a constant. In one embodiment, the measure of readability or reliability $r_{f(i)}$ can be a Boolean value. In one embodiment, the measure of readability or reliability $r_{f(i)}$ can be a probability (a ratio of success to total) determined from tests in which a plurality of distorted or blurred code images, including cell patterns, are analyzed.

When determining a cell pattern 14 for each set element of a pattern assignment set P', smoothness between neighboring patches of the halftone picture $I_f$ can be further considered. To this end, the energy function can be defined as either of the following:

$$E_{total}(P') = E_D(P') + \omega_S E_S(P') + E_C(P') \quad (12)$$

$$E_{total}(P') = \lambda E_R(P') + E_D(P') + \omega_S E_S(P') + E_C(P') \quad (13)$$

where $\omega_S$ is a weight for the smoothness term $E_S(P')$, which can be defined as one of the following equations (14a) to (14c):

$$E_S(P') = \sum_{e_{i,j} \in E} \exp(-D(I_i^m, I_j^m)) D(I_{f(i)}^p, I_{f(j)}^p) \quad (14a)$$

$$E_S(P') = \sum_{e_{i,j} \in E} \left( \frac{k_1}{D(I_i^m, I_j^m)} \right) D(I_{f(i)}^p, I_{f(j)}^p) \quad (14b)$$

$$E_S(P') = \sum_{e_{i,j} \in E} (k_1 - D(I_i^m, I_j^m)) D(I_{f(i)}^p, I_{f(j)}^p) \quad (14c)$$

where $k_1$ is a constant; $e_{i,j}$ is the above-mentioned edge. In one embodiment, the weight $\omega_S$ can be, for example, 0.2.

The smoothness term $E_S(P')$ comprises a distance metric $D(I_i^m, I_j^m)$ for measuring neighboring patches of the halftone picture $I_f$ and a distance metric $D(I_{f(i)}^p, I_{f(j)}^p)$ for measuring any pair of the plurality of cell patterns 14.

As shown in FIG. 1, since the set P will not be changed, the distance metric $D(I_{f(i)}^p, I_{f(j)}^p)$ can be initially determined. The method of the present disclosure selects a pair of the plurality of cell patterns 14 on a computer device and determines the distance metric of the pair. After all possible pairs of the plurality of cell patterns 14 are determined, the computed distance metrics are assembled into a pair-wise similarity matrix 16. When a distance metric $D(I_{f(i)}^p, I_{f(j)}^p)$ is needed, the distance metric $D(I_{f(i)}^p, I_{f(j)}^p)$ can be directly obtained from the pair-wise similarity matrix 16, and no computation is required.

All the above energy functions are then reorganized so that the energy functions can be expressed in unary and binary terms, and then, a graph cut algorithm can be used to solve the energy functions to determine a pattern cell for each set element of the pattern assignment set P'. The graph cut algorithm can be, but is not limited to, an algorithm disclosed in a paper entitled "Fast approximate energy minimization via graph cuts," *IEEE Trans. Pattern Anal. Mach. Intell.* 23, 11, 1222-1239, 2011, by Boykov, Y. Veksler et al., the relevant disclosures of which are incorporated herein for reference.

Figure 2:
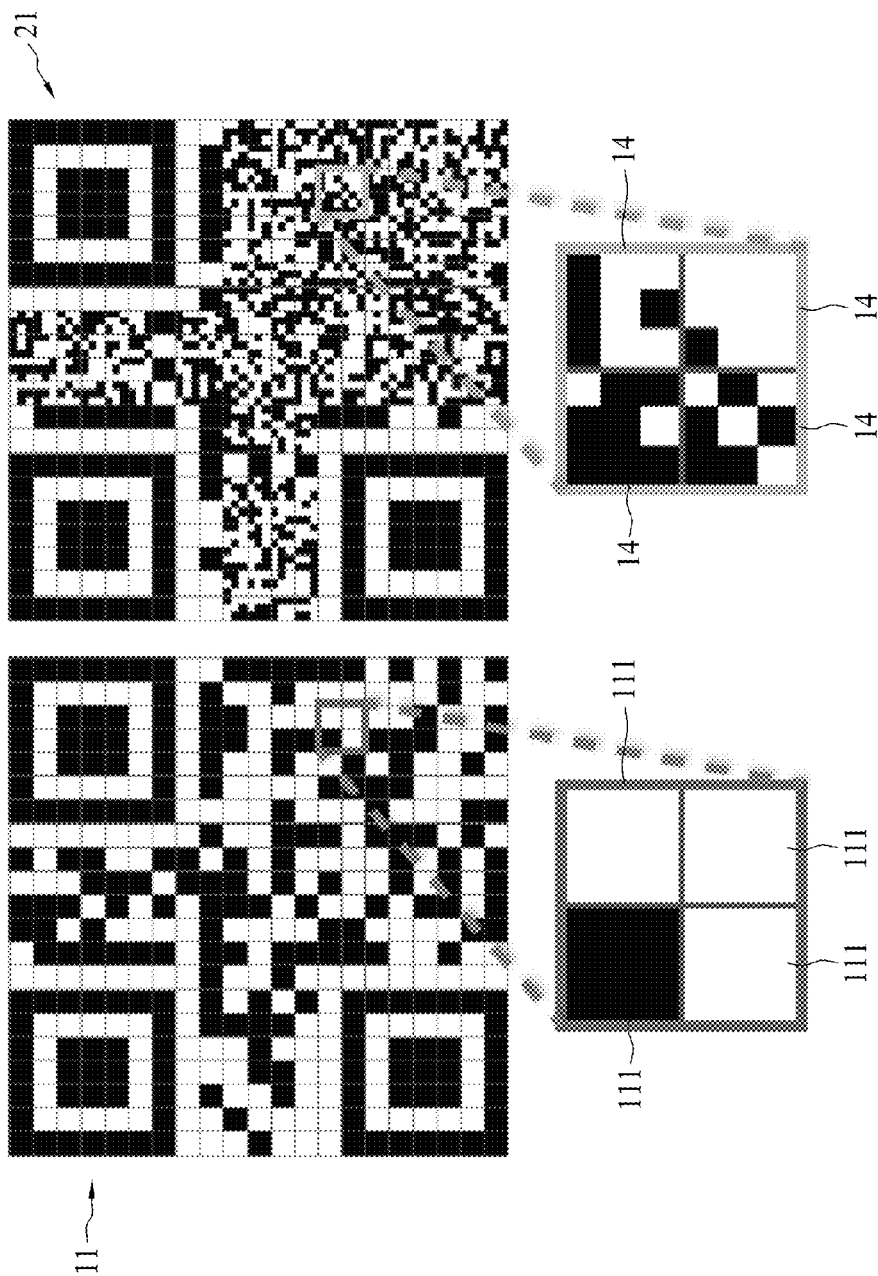
FIG. 2 is a schematic view showing a plurality of cells of an original two dimensional code and corresponding cell patterns of a synthetic code according to one embodiment of the present invention.

The measure of readability or reliability $r_{f(i)}$ can be determined by the following procedure. The procedure initially generates a plurality of two dimensional codes by randomly determined data string and the same data encoding library. The procedure then randomly selects a cell pattern 14 from the above-mentioned set P or a sub-set of the above-mentioned set P, and uses the selected cell pattern 14 to replace a cell of one of the plurality of two dimensional codes having a bit value which is the same as that of the selected cell pattern 14 (the colors of each cell of the two dimensional code of FIG. 2 and the center sub-cell of the corresponding cell pattern 14 are the same), as shown in FIG. 2. The step continues until each desired cell of all two dimensional codes is replaced, and after that, a plurality of synthetic codes 21 are obtained.

The procedure next introduces at least one or more spatial perturbations to each synthetic code 21 to simulate the situations that the synthetic codes are incorrectly scanned, and as a result, blurred, distorted or poorly illuminated code images are generated. For example, in order to simulate that a code is scanned not exactly in front of a code reader, a yaw, pitch, or translation perturbation is applied to a code image. A rotation range between -3 and 3 degrees and a translation between -1 and 1 pixel are employed. In addition, a random scaling range from 1 to 30 is used to simulate the separation of a code reader from a code by different distances.

The images of the synthetic codes 21 are decoded cell-wise to determine whether every cell can be decoded correctly. The procedure then calculates a ratio of success to total, which is a probability of success, for each cell as a measure of readability or reliability. In one embodiment, the measure of readability or reliability is a normalized value.

Furthermore, the method of the present disclosure is configured to utilize an error correction capability of a two dimensional code on a computer device to further improve the reliability of the two dimensional code. The method of the present disclosure is configured to allow a few cells to be free from being subject to the binding constraint so that the cells can be respectively replaced by cell patterns that are most similar to corresponding patches of the halftone picture. Thus, a new two dimensional code with high quality visualization can be obtained. In order to allow a few cells to be free from being subject to the binding constraint, the binding constraint $E_C(P')$ can be re-defined as:

$$E_C(P') = \sum_{m_i \in M} \beta_i \delta_{m_i, p'_i} \quad (15)$$

The $\beta_i$ of the cell that is not subject to the binding constraint is set at zero.

After the equation (15) is calculated, an energy equation is solved and the number of erroneous codewords is determined.

For example, when the two dimensional code is a QR code, the importance weights of, for example, eight cells are averaged to compute a priority of a codeword. Next, the $\beta_i$'s of the cells corresponding to the codeword with a highest priority are set to zero. Thereafter, an energy equation is determined and solved, and the number of erroneous codewords in each RS (Reed Solomon) block is determined. If the number of erroneous codewords is greater than a predetermined number, for example 50% of error correction capacity (ECC), the $\beta_i$'s of the cells corresponding to the codeword with a next highest priority are additionally set to zero, and then, the energy equation is determined and solved again. Thereafter, the number of erroneous codewords in each RS block is determined and compared with a predetermined number. The above steps are repeated until the number of erroneous codewords in each RS block reaches the predetermined number.

In another embodiment, user can select cells that are in a salient feature region, and the $\beta_i$'s of the selected cells are set at zero.

Figure 3:
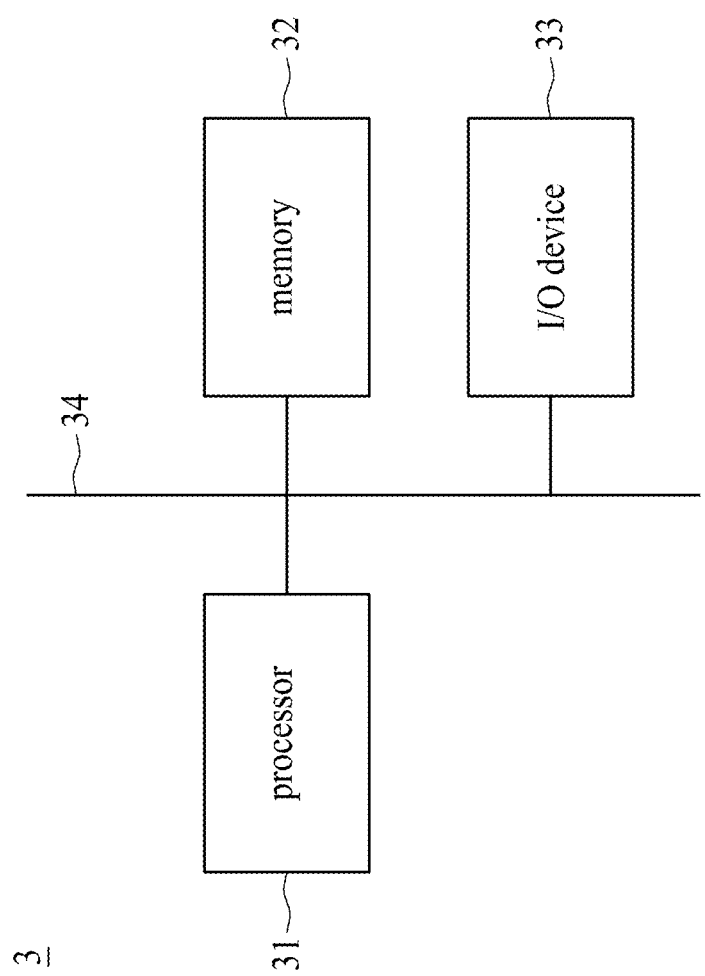
FIG. 3 is a schematic view showing a computer device according to one embodiment of the present invention.

In one embodiment of the present disclosure, the above-mentioned computer device can be a processor, such as a CPU (central processor unit), a GPU (graphics processing unit), a soft microprocessor or the like. In one embodiment, the above-mentioned computer device may comprise a system on a chip. In one embodiment, the above-mentioned computer device comprises a computer comprising at least one processor and a memory. In one embodiment, as shown in FIG. 3, a computer device 3 comprises a processor 31, a memory 32 such as a volatile memory or a non-volatile memory, and an input or output device 33 for external communications. The processor 31, the memory 32, and the input or output device 33 can be coupled with a bus 34.

The above-mentioned embodiments can be applied to a video or video clip. In Step (a), a method of embedding at least one two dimensional code into a video or video clip initially extracts a video or video clip to obtain a plurality of image frames or pictures. In Step (b), an image frame is converted into a halftone picture and is processed to determine where salient feature regions are located. In Step (c), a cell of a corresponding two dimensional code is replaced by a suitable cell pattern including a plurality of sub-cells according to the bit value of the cell and a corresponding patch of the image frame. The Step (c) is repeated until all cells to be replaced are replaced, and a new or visual two dimensional code is obtained. In Step (d), the Steps (b) and (c) are applied to the remaining image frames to obtain a plurality of new or visual two dimensional codes. In Step (e), all the new or visual two dimensional codes are converted to a new video or video clip.

The above-mentioned picture and/or code can be of any suitable and desired form, and may, for example, be in a digital or physical form.

The above-described embodiments of the present invention are intended to be illustrative only. Those skilled in the art may devise numerous alternative embodiments without departing from the scope of the following claims.

What is claimed is:

1. A computer-implemented method of creating a two dimensional code, comprising:
   providing a two dimensional code comprising a cell;
   providing a picture comprising a patch corresponding to the cell of the two dimensional code;
   providing a plurality of cell patterns different from each other, wherein each cell pattern comprises a plurality of sub-cells; and
   determining one of the plurality of cell patterns for the cell of the two dimensional code according to the patch of the picture;
   wherein the cell and the one of the plurality of cell patterns has a same bit value.

2. The method of claim 1, wherein the one of the plurality of cell patterns is determined for the cell of the two dimensional code by considering a distance metric between the one of the plurality of cell patterns and the patch of the picture.

3. The method of claim 1, wherein the one of the plurality of cell patterns is determined for the cell of the two dimensional code by further considering an importance weight indicating visual importance of the patch of the picture.

4. The method of claim 1, wherein the one of the plurality of cell patterns is determined for the cell of the two dimensional code by further considering smoothness between the patch and a neighboring patch thereof.

5. The method of claim 1, wherein the one of the plurality of cell patterns is determined for the cell of the two dimensional code by further considering a plurality of distance metrics, each of which is used for a pair of the plurality of cell patterns.

6. The method of claim 1, wherein the one of the plurality of cell patterns is determined for the cell of the two dimensional code by further considering a measure of readability.

7. The method of claim 6, wherein the measure of readability is determined by:
   providing a plurality of another two dimensional codes;
   replacing each cell of each of the plurality of another two dimensional codes with one of the cell patterns that has a same bit value to obtain a plurality of synthetic codes;
   decoding each synthetic code when at least one spatial perturbation is introduced;
   determining a successfully decoded rate for each cell pattern; and
   using the successfully decoded rate to determine the measure of readability for the corresponding cell pattern.

8. A computer-implemented method of creating a two dimensional code, comprising
   providing a two dimensional code comprising a plurality of cells;
   providing a picture comprising a plurality of patches corresponding to the plurality of cells of the two dimensional code;
   providing a plurality of cell patterns different from each other, wherein each cell pattern comprises a plurality of sub-cells;
   providing a pattern assignment set comprising a plurality of set elements correspondingly representing the plurality of cells of the two dimensional code;
   defining an energy function according to the pattern assignment set, the two dimensional code, the picture, and the plurality of cell patterns; and
   using the energy function to determine, for each set element, one of the plurality of cell patterns.

9. The method of claim 8, wherein the energy function comprises a data term that is used to measure similarity distances between the picture and the pattern assignment set.

10. The method of claim 8, wherein the energy function comprises a smoothness term that is used to impose a penalty for the determination of cell patterns for the pattern assignment set that violates spatial smoothness.

11. The method of claim 8, wherein the energy function comprises a reliability term that comprises importance weights indicating visual importance of the corresponding patches of the picture.

12. The method of claim 8, wherein the energy function comprises a reliability term that is used to improve the readability of the pattern assignment set.

13. The method of claim 12, wherein the reliability term is defined as:

$$E_R(P') = \sum_{m_i \in M} \exp(-\omega_i)(1.0 - R(m_i, p'_i))$$

where $$R(m_i, p'_i) = \begin{cases} r_{f(i)} & \text{if } c^p_{f(i)} = c^m_i \\ 0 & \text{otherwise} \end{cases};$$

$m_i$ is the $i^{th}$ element of a set $M=\{m_i=(I_i^m, c_i^m, \omega_i)|i=1, \ldots, n\}$; $\omega_i$ is the importance weight of the $i^{th}$ patch; $I_i^m$ is a bit value of the $i^{th}$ patch; $c_i^m$ is a bit value of the $i^{th}$ cell of the two dimensional code; n is the number of the cells; P' is the pattern assignment set; $p'_i$ is the $i^{th}$ set element of the pattern assignment set; $c_{f(i)}^p$ is a bit value of the $f(i)^{th}$ cell pattern; and $r_{f(i)}$ is a readability or reliability value.

14. The method of claim 13, wherein the readability value is determined by:
providing a plurality of another two dimensional codes;
replacing each cell of each of the plurality of another two dimensional codes with one of the cell patterns that has a same bit value to obtain a plurality of synthetic codes;
decoding each synthetic code when at least one spatial perturbation is introduced;
determining a successfully decoded rate for each cell pattern; and
using the successfully decoded rate to determine the readability value for the corresponding cell pattern.

15. The method of claim 8, wherein the energy function comprises a binding constraint that is used to ensure each cell pattern assigned to the pattern assignment set has the same bit value as the corresponding cell of the picture.

16. The method of claim 8, wherein the energy function comprises a binding constraint that is used to ensure each of at least a portion of cell patterns assigned to the pattern assignment set has the same bit value as the corresponding cell of the picture.

* * * * *